United States Patent
Roziere

(10) Patent No.: US 10,007,388 B2
(45) Date of Patent: Jun. 26, 2018

(54) DEVICE AND METHOD FOR CONTROL INTERFACE SENSITIVE TO A MOVEMENT OF A BODY OR OF AN OBJECT AND VIEWING SCREEN INTEGRATING THIS DEVICE

(71) Applicant: QUICKSTEP TECHNOLOGIES LLC, Wilmington, DE (US)

(72) Inventor: Didier Roziere, Nimes (FR)

(73) Assignee: QUICKSTEP TECHNOLOGIES LLC, Wilmington, DE (US)

( * ) Notice: Subject to any disclaimer, the term of this patent is extended or adjusted under 35 U.S.C. 154(b) by 14 days.

(21) Appl. No.: 15/396,213

(22) Filed: Dec. 30, 2016

(65) Prior Publication Data

US 2017/0108968 A1 Apr. 20, 2017

Related U.S. Application Data

(63) Continuation of application No. 14/341,230, filed on Jul. 25, 2014, now Pat. No. 9,535,547, which is a
(Continued)

(30) Foreign Application Priority Data

Aug. 7, 2009 (FR) ...................................... 09 55583

(51) Int. Cl.
G06F 3/044 (2006.01)
G06F 3/041 (2006.01)
(Continued)

(52) U.S. Cl.
CPC ............ G06F 3/044 (2013.01); G06F 3/0412 (2013.01); G06F 3/0416 (2013.01);
(Continued)

(58) Field of Classification Search
CPC ........ G06F 3/041; G06F 3/0412; G06F 3/042; G06F 3/0425; G06F 3/044;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 1202254 A 12/1998
CN 2012-18943 Y 4/2009
(Continued)

OTHER PUBLICATIONS

Final Office Action dated Jan. 15, 2015, for U.S. Appl. No. 14/354,334, filed Apr. 25, 2014, 23 pages.
(Continued)

*Primary Examiner* — Joe H Cheng
(74) *Attorney, Agent, or Firm* — Morrison & Foerster LLP

(57) ABSTRACT

A device for control interface sensitive to movement of a body, includes a detection surface; at least one capacitive sensor including a measurement electrode including an active surface facing the detection surface, or substantially coinciding with the detection surface; electronic excitation and processing components for exciting the measurement electrodes at an alternating electrical potential and processing the signals emanating from the capacitive sensors, to provide distance information between the active surface of the electrodes and one or several objects; a guard of electrically conducting material disposed in proximity to the measurement electrodes, at least along the face of the measurement electrodes substantially opposite to the active surface, which guard is excited at an alternating electrical
(Continued)

potential substantially identical to the alternating electrical potential of the measurement electrodes, wherein: the measurement electrodes and the guard are made of substantially transparent conducting materials; and the device for interface is substantially transparent.

20 Claims, 4 Drawing Sheets

Related U.S. Application Data continuation of application No. 13/388,611, filed as application No. PCT/FR2010/051668 on Aug. 6, 2010, now Pat. No. 8,917,256.

(51) Int. Cl.
    *G06F 3/042*     (2006.01)
    *G06F 3/0488*     (2013.01)
    *G06F 3/16*     (2006.01)

(52) U.S. Cl.
    CPC .......... *G06F 3/0418* (2013.01); *G06F 3/0425* (2013.01); *G06F 3/04883* (2013.01); *G06F 3/167* (2013.01); *G06F 2203/04101* (2013.01); *G06F 2203/04104* (2013.01); *G06F 2203/04105* (2013.01); *G06F 2203/04106* (2013.01); *G06F 2203/04107* (2013.01); *G06F 2203/04808* (2013.01)

(58) Field of Classification Search
    CPC ........ G06F 3/04883; G06F 3/16; G06F 3/167; G06F 2203/04101; G06F 2203/04104; G06F 2203/04106; G06F 2203/04111; G06F 2203/04808; G01R 27/2605
See application file for complete search history.

(56) References Cited

U.S. PATENT DOCUMENTS

| | | | |
|---|---|---|---|
| 5,650,597 A | 7/1997 | Redmayne | |
| 5,825,352 A | 10/1998 | Bisset et al. | |
| 5,835,079 A | 11/1998 | Shieh | |
| 5,841,427 A | 11/1998 | Teterwak | |
| 5,844,506 A | 12/1998 | Binstead | |
| 5,847,690 A | 12/1998 | Boie et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 6,025,647 A | 2/2000 | Shenoy et al. | |
| 6,188,391 B1 | 2/2001 | Seely et al. | |
| 6,204,897 B1 | 3/2001 | Colgan et al. | |
| 6,310,610 B1 | 10/2001 | Beaton et al. | |
| 6,323,846 B1 | 11/2001 | Westerman et al. | |
| 6,587,358 B1 | 7/2003 | Yasumura | |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,570,064 B2 | 8/2009 | Roziere | |
| 7,663,607 B2 | 2/2010 | Hotelling et al. | |
| 7,898,122 B2 | 3/2011 | Andrieux et al. | |
| 8,059,103 B2 * | 11/2011 | Geaghan | G06F 3/044 345/173 |
| 8,149,002 B2 | 4/2012 | Ossart et al. | |
| 8,159,213 B2 | 4/2012 | Roziere | |
| 8,264,428 B2 | 9/2012 | Nam | |
| 8,355,887 B1 | 1/2013 | Harding et al. | |
| 8,479,122 B2 | 7/2013 | Hotelling et al. | |
| 8,576,161 B2 | 11/2013 | Chang et al. | |
| 8,654,083 B2 | 2/2014 | Hotelling et al. | |
| 8,665,237 B2 | 3/2014 | Koshiyama et al. | |
| 8,766,950 B1 | 7/2014 | Morein et al. | |
| 8,770,033 B2 | 7/2014 | Roziere | |
| 8,773,351 B2 | 7/2014 | Rekimoto | |
| 8,890,850 B2 | 11/2014 | Chung et al. | |
| 8,917,256 B2 | 12/2014 | Roziere | |
| 9,000,782 B2 | 4/2015 | Roziere | |
| 9,035,903 B2 | 5/2015 | Binstead | |
| 9,117,679 B2 | 8/2015 | Ma | |
| 9,151,791 B2 | 10/2015 | Roziere | |
| 9,250,757 B2 | 2/2016 | Roziere | |
| 9,268,427 B2 | 2/2016 | Yousefpor et al. | |
| 9,336,723 B2 | 5/2016 | Gupta et al. | |
| 9,442,330 B2 | 9/2016 | Huo | |
| 9,448,675 B2 | 9/2016 | Morein et al. | |
| 9,640,991 B2 | 5/2017 | Blondin et al. | |
| 2002/0015024 A1 | 2/2002 | Westerman et al. | |
| 2003/0075427 A1 | 4/2003 | Caldwell | |
| 2004/0243747 A1 | 12/2004 | Rekimoto | |
| 2005/0219228 A1 | 10/2005 | Alameh et al. | |
| 2006/0001640 A1 | 1/2006 | Lee | |
| 2006/0097733 A1 | 5/2006 | Roziere | |
| 2006/0161871 A1 | 7/2006 | Hotelling et al. | |
| 2006/0197753 A1 | 9/2006 | Hotelling | |
| 2006/0284639 A1 * | 12/2006 | Reynolds | G01D 5/24 324/688 |
| 2007/0279395 A1 | 12/2007 | Philipp | |
| 2008/0012835 A1 | 1/2008 | Rimon et al. | |
| 2008/0042985 A1 | 2/2008 | Katsuhito et al. | |
| 2008/0061800 A1 * | 3/2008 | Reynolds | G01R 27/2605 324/678 |
| 2008/0062148 A1 | 3/2008 | Hotelling et al. | |
| 2008/0074401 A1 | 3/2008 | Chung et al. | |
| 2008/0100572 A1 | 5/2008 | Boillot | |
| 2008/0158182 A1 | 7/2008 | Westerman | |
| 2008/0174321 A1 | 7/2008 | Kang et al. | |
| 2008/0180365 A1 | 7/2008 | Ozaki | |
| 2008/0246496 A1 | 10/2008 | Hristov et al. | |
| 2008/0284261 A1 | 11/2008 | Andrieux et al. | |
| 2008/0303770 A1 | 12/2008 | Oke et al. | |
| 2008/0303964 A1 | 12/2008 | Lee et al. | |
| 2009/0091546 A1 | 4/2009 | Joo et al. | |
| 2009/0141046 A1 | 6/2009 | Rathnam et al. | |
| 2009/0174686 A1 | 7/2009 | Jeon et al. | |
| 2009/0179868 A1 | 7/2009 | Ayres et al. | |
| 2009/0212642 A1 | 8/2009 | Krah | |
| 2009/0238012 A1 | 9/2009 | Tatapudi et al. | |
| 2009/0251427 A1 | 10/2009 | Hung et al. | |
| 2009/0309851 A1 | 12/2009 | Bernstein | |
| 2009/0322730 A1 | 12/2009 | Yamamoto et al. | |
| 2010/0004029 A1 | 1/2010 | Kim | |
| 2010/0007616 A1 | 1/2010 | Jang | |
| 2010/0013745 A1 | 1/2010 | Kim et al. | |
| 2010/0019779 A1 | 1/2010 | Kato et al. | |
| 2010/0031174 A1 | 2/2010 | Kim | |
| 2010/0052700 A1 | 3/2010 | Yano et al. | |
| 2010/0090964 A1 | 4/2010 | Soo et al. | |
| 2010/0097346 A1 | 4/2010 | Sleeman | |
| 2010/0123667 A1 | 5/2010 | Kim et al. | |
| 2010/0139991 A1 | 6/2010 | Philipp et al. | |
| 2010/0149127 A1 | 6/2010 | Fisher et al. | |
| 2010/0182018 A1 | 7/2010 | Hazelden | |
| 2010/0201635 A1 | 8/2010 | Klinghult et al. | |
| 2010/0253638 A1 | 10/2010 | Yousefpor et al. | |
| 2010/0265187 A1 | 10/2010 | Chang et al. | |
| 2010/0265188 A1 | 10/2010 | Chang et al. | |
| 2010/0321305 A1 | 12/2010 | Chang et al. | |
| 2010/0328262 A1 | 12/2010 | Huang et al. | |
| 2011/0001491 A1 | 1/2011 | Huang et al. | |
| 2011/0006999 A1 | 1/2011 | Chang et al. | |
| 2011/0007021 A1 | 1/2011 | Bernstein et al. | |
| 2011/0007030 A1 | 1/2011 | Mo et al. | |
| 2011/0061949 A1 | 3/2011 | Krah et al. | |
| 2011/0080391 A1 | 4/2011 | Brown et al. | |
| 2011/0169783 A1 | 7/2011 | Wang et al. | |
| 2011/0242027 A1 | 10/2011 | Chang | |
| 2011/0298727 A1 | 12/2011 | Yousefpor et al. | |
| 2012/0044662 A1 | 2/2012 | Kim et al. | |
| 2012/0182251 A1 | 7/2012 | Krah | |
| 2012/0187965 A1 | 7/2012 | Roziere | |
| 2012/0188200 A1 | 7/2012 | Roziere | |

(56) References Cited

U.S. PATENT DOCUMENTS

| | | |
|---|---|---|
| 2012/0242597 A1 | 9/2012 | Hwang et al. |
| 2012/0274603 A1 | 11/2012 | Kim et al. |
| 2013/0076647 A1 | 3/2013 | Yousefpor et al. |
| 2013/0076648 A1 | 3/2013 | Krah et al. |
| 2013/0106755 A1 | 5/2013 | Hotelling et al. |
| 2013/0135247 A1 | 5/2013 | Na et al. |
| 2013/0141343 A1 | 6/2013 | Yu et al. |
| 2013/0170116 A1 | 7/2013 | In et al. |
| 2013/0181943 A1 | 7/2013 | Bulea et al. |
| 2013/0194231 A1 | 8/2013 | Smith et al. |
| 2013/0285971 A1 | 10/2013 | Eltas et al. |
| 2013/0293499 A1 | 11/2013 | Chang et al. |
| 2013/0307776 A1 | 11/2013 | Roziere |
| 2013/0314393 A1 | 11/2013 | Min et al. |
| 2013/0328795 A1 | 12/2013 | Yao et al. |
| 2013/0328800 A1 | 12/2013 | Pu et al. |
| 2013/0342431 A1 | 12/2013 | Saeedi et al. |
| 2013/0342479 A1 | 12/2013 | Pyo et al. |
| 2014/0028535 A1 | 1/2014 | Min et al. |
| 2014/0043546 A1 | 2/2014 | Yamazaki et al. |
| 2014/0070823 A1 | 3/2014 | Roziere |
| 2014/0078096 A1 | 3/2014 | Tan et al. |
| 2014/0078097 A1 | 3/2014 | Shepelev et al. |
| 2014/0103712 A1 | 4/2014 | Blondin et al. |
| 2014/0111496 A1 | 4/2014 | Gomez et al. |
| 2014/0132335 A1 | 5/2014 | Rauhala et al. |
| 2014/0132534 A1 | 5/2014 | Kim |
| 2014/0132560 A1 | 5/2014 | Huang et al. |
| 2014/0267070 A1 | 9/2014 | Shahparnia et al. |
| 2014/0267165 A1 | 9/2014 | Roziere |
| 2014/0327654 A1 | 11/2014 | Sugita et al. |
| 2015/0035787 A1 | 2/2015 | Shahparnia et al. |
| 2015/0035792 A1 | 2/2015 | Roziere et al. |
| 2015/0084911 A1 | 3/2015 | Stronks et al. |
| 2015/0116243 A1 | 4/2015 | Saitou et al. |
| 2015/0194470 A1 | 7/2015 | Hwang |
| 2015/0277648 A1 | 10/2015 | Small |
| 2016/0034102 A1 | 2/2016 | Roziere et al. |
| 2016/0117017 A1 | 4/2016 | Kremin et al. |
| 2016/0170533 A1 | 6/2016 | Roziere |
| 2016/0211808 A1 | 7/2016 | Lee et al. |
| 2016/0224177 A1 | 8/2016 | Krah |
| 2016/0253034 A1 | 9/2016 | Gupta et al. |
| 2016/0320898 A1 | 11/2016 | Tang |
| 2017/0090644 A1 | 3/2017 | Yao |
| 2017/0139539 A1 | 5/2017 | Yao et al. |
| 2017/0168619 A1 | 6/2017 | Yang et al. |
| 2017/0220156 A1 | 8/2017 | Blondin |
| 2017/0315646 A1 | 11/2017 | Roziere |
| 2017/0351378 A1 | 12/2017 | Wang et al. |

FOREIGN PATENT DOCUMENTS

| | | |
|---|---|---|
| CN | 102 760 405 A | 10/2012 |
| CN | 10-2881839 A | 1/2013 |
| DE | 11-2012 004912 T5 | 8/2014 |
| EP | 2 144 146 A1 | 1/2010 |
| EP | 2 224 277 A1 | 9/2010 |
| EP | 2 267 791 A2 | 10/2010 |
| EP | 2 256 606 A2 | 12/2010 |
| FR | 2 756 048 A1 | 5/1998 |
| FR | 2756048 A1 | 5/1998 |
| FR | 2 896 595 A1 | 7/2007 |
| FR | 2 949 008 | 2/2011 |
| FR | 3 004 551 A1 | 10/2014 |
| JP | H10-505183 A | 5/1998 |
| JP | 2000-163031 A | 6/2000 |
| JP | 2002-342033 A | 11/2002 |
| JP | 2004-526265 A | 8/2004 |
| JP | 2006-251927 A | 9/2006 |
| JP | 2008-117371 A | 5/2008 |
| JP | 2009-086240 A | 4/2009 |
| JP | 2009-157373 A | 7/2009 |
| JP | 2011-141464 A | 7/2011 |
| JP | 2013-109095 A | 6/2013 |
| KR | 10-2008-0041278 A | 5/2008 |
| KR | 10-2008-0060127 A | 7/2008 |
| KR | 10-2010-0054899 A | 5/2010 |
| KR | 10-2011-0044670 A | 4/2011 |
| TW | 201126236 A | 8/2011 |
| WO | WO-2007/003108 A1 | 1/2007 |
| WO | WO-2007/146780 A2 | 12/2007 |
| WO | WO-2008/000964 A1 | 1/2008 |
| WO | WO-2008/030780 A1 | 3/2008 |
| WO | WO-2011/015795 A3 | 2/2011 |
| WO | WO-2013/093327 A1 | 6/2013 |
| WO | WO-2015/088629 A1 | 6/2015 |
| WO | WO-2015/175013 A1 | 11/2015 |
| WO | WO-2015/178920 | 11/2015 |
| WO | WO-2016/066282 A1 | 5/2016 |
| WO | WO-2016/126525 A1 | 8/2016 |

OTHER PUBLICATIONS

French Search Report, dated Mar. 14, 2012, from corresponding FR application.
International Search Report dated Dec. 3, 2012, from corresponding PCT application.
International Search Report dated Apr. 16, 2013, corresponding to PCT/FR2012/052974, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Mar. 17, 2014, for U.S. Appl. No. 13/388,611, filed Apr. 10, 2012, sixteen pages.
Non-Final Office Action dated May 1, 2014, for U.S. Appl. No. 13/388,627, filed Apr. 10, 2012, eight pages.
Non-Final Office Action dated Sep. 16, 2014, for U.S. Appl. No. 14/354,334, filed Apr. 25, 2014, 24 pages.
Non-Final Office Action dated Nov. 2, 2015, for U.S. Appl. No. 14/341,230, filed Jul. 25, 2014, nine pages.
Non-Final Office Action dated Mar. 10, 2016, for U.S. Appl. No. 14/126,163, filed Dec. 13, 2013, four pages.
Notice of Allowance dated Nov. 28, 2014, for U.S. Appl. No. 13/388,627, filed Apr. 10, 2012, seven pages.
Notice of Allowance dated Jun. 10, 2015, for U.S. Appl. No. 14,082,678, filed Nov. 18, 2013, seven pages.
Notice of Allowance dated Sep. 25, 2015, for U.S. Appl. No. 14/354,334, filed Apr. 25, 2014, seven pages.
Notice of Allowance dated May 9, 2016, for U.S. Appl. No. 14/341,230, filed Jul. 25, 2014, five pages.
Notice of Allowance dated Aug. 8, 2016, for U.S. Appl. No. 14/126,163, filed Dec. 13, 2013, seven pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated Jan. 13, 2017, for U.S. Appl. No. 14/126,163, filed Dec. 13, 2013, seven pages.
Chinese Search Report dated Apr. 6, 2017, for CN Application No. 201280063934.9, with English translation, four pages.
International Search Report dated Oct. 21, 2015, for PCT Application No. PCT/EP2015/063857, six pages.
Yang, J-H. et al. (Jul. 2013). "A Noise-Immune High-Speed Readout Circuit for In-Cell Touch Screen Panels," *IEEE Transactions on Circuits and Systems—I: Regular Papers* 60(7):1800-1809.
Non-Final Office Action dated Sep. 11, 2017, for U.S. Appl. No. 15/008,369, filed Jan. 27, 2016, 12 pages.

(56) References Cited

OTHER PUBLICATIONS

Chinese Search Report dated Mar. 2, 2018, for CN Application No. 201510863213.1, with English translation, four pages.

* cited by examiner

DEVICE AND METHOD FOR CONTROL INTERFACE SENSITIVE TO A MOVEMENT OF A BODY OR OF AN OBJECT AND VIEWING SCREEN INTEGRATING THIS DEVICE

CROSS-REFERENCES TO RELATED APPLICATIONS

This application is a continuation application of U.S. patent application Ser. No. 14/341,230, filed Jul. 25, 2014 and published on Nov. 27, 2014 (now U.S. Pat. No. 9,535,547 B2, issued Jan. 3, 2017) which is a continuation application of U.S. patent application Ser. No. 13/388,611, filed Apr. 10, 2012 (now U.S. Pat. No. 8,917,256, issued Dec. 23, 2014), which is a National Stage Entry of PCT/FR2010/051668, filed Aug. 6, 2010 and published on Feb. 10, 2011 as Publication No. WO 2011/015794, which claims priority to French Application No. 0955583 filed Aug. 7, 2009; the contents of which are incorporated herein by references in their entirety for all intended purposes.

TECHNICAL FIELD

The present invention relates to a device for control interface, in particular gestural and/or tactile possibly combined to a vocal control, sensitive to a movement of a body or of an object or voice. It also aims at a method for control interface implemented in this device, as well as a control equipment implementing such a device.

The field of the invention is more particularly, but not limited to, gestural and/or tactile and possibly vocal man-machine interfaces, enabling movements of the body, hand, finger or an object to be interpreted in real time, at a long distance to the touch, these movements being combined or not to a vocal request in order to perform one or more controls.

BACKGROUND

So-called virtual, that is gestural and/or tactile and vocal man-machine interfaces, as opposed to interfaces where the user acts on mechanical sensors such as keyboard keys or switches, are most often 3D cameras in the field of gestural interface and active surfaces, often transparent and integrated on the display screens, in the field of tactile interface. These tactile interfaces are widespread under the name of "touchpad" for multiple industrial and consumer applications, such as for example smartphones, home automation or game interfaces.

The screen enables to display for example a keyboard or the software interface the image of which varies in response to actions from the user, which generally consist of a displacement, a tapping or even a prolonged contact of the finger or a stylus onto the screen surface in order to perform controls. More recently, so-called gestural interfaces have developed to meet the increasingly great complexity of digital products emanating from the convergence of communication and entertainment information technologies. These interfaces are most often based on a 3D camera and an image processing capable of interpreting at a long distance, up to 5 meters, the movements of the body or the hand to interact with the screen.

Among virtual controls, can also be mentioned the vocal control which enables the request to be performed from the voice.

Among existing tactile technologies, capacitive technologies are frequently used because: they do not require exerting any mechanical action onto the screen surface unlike resistive techniques for example,
they are well-adapted to the meshing of the screen surface by a sensor network directly integrated to the surface thereof, which enables a much more compact and robust integration than with optical techniques for example which require a network of transmitters-receivers raised with respect to the detection surface.

It is more and more attempted in virtual interfaces to have a proximity detection function, which enables new man-machine interaction modes to be created without any contact. Sensors must then be able to detect displacements or shapes within several centimeters, in a sufficiently accurate and determined manner to be able to transform them into controls.

If optical technologies cannot be dispensed with when accurately detecting movements at a very long distance (beyond 40 centimeters), capacitive technologies turn out to be very well adapted to interfaces without proximity contact, in particular because all sensors can be integrated to a non-planar active surface, for example a screen, without dead area or without requiring external devices (cameras).

Amongst capacitive tactile interfaces, the most used techniques are generally based on the charge transfer principle. They enable sensitivity in the order of one picofarad to be obtained but they are not adapted to make a gestural interface. Indeed, their sensitivity does not enable the approach of a finger to be detected because the capacity generated does not then exceed a few hundred picofarads. Stray capacitances present in this type of sensor and in electronics prevent any sensitivity improvement.

Moreover, these techniques are very sensitive to electromagnetic disturbances, stray electrical charges and electric conduction of the dielectric covering the electrodes. When the air relative humidity is higher than 60%, most dielectrics become slightly electrically conducting and charges generated by the electronics are modified, which disturbs the capacitive measurement. Among technical solutions employed to make non-tactile capacitive interfaces, some are known which implement a pseudo-guard enabling the stray capacitances to be strongly reduced in the sensor and electronics. However, these techniques only enable at most one order of magnitude on sensitivity to be gained, which enables the presence of a finger to be detected at only a few mm on the sensitive surface of the sensor.

Regarding capacitive gestural interfaces, it is known from document U.S. Pat. No. 6,847,354 to Vranish, capacitive sensors implemented with an active guard. This active guard is created using a unity gain amplifier which generates in the guard a voltage with an amplitude identical to that of the measurement electrode.

The drawback of this method is that the electronics generates by a physical principle stray capacitances which correspond to the sum of the input capacitances of the amplifier to generate the active guard, also called pseudo-guard, and of the circuit to excite the measurement electrode. These stray capacitances easily reach one picofarad and add up to the capacitance to be measured, which only represent one hundredth of this total value.

Moreover, the capacitance measurement is not direct because the Vranish electronics obtains the image of the capacitance to be measured by measuring its current via a reference resistor. This resistor generates a stray phase shift of the electrical current which strongly degrades the detection quality, or of demodulation of the signal representing the capacitance to be measured. Another drawback is the crosstalk level between different electrodes. Indeed, each electrode is excited by an operational amplifier the gain of which is approximately a unity one. Any gain deviation between different amplifiers causes a high further stray capacitance.

These drawbacks do not enable the position of an object such as a finger or a hand to be detected and located at several centimeters or even tens of centimeters with each sensor.

On the other hand, capacitive technologies implemented for making gestural interfaces have been developed most often in an attempt to be integrated to screens or at least substantially planar surfaces. The structures of sensors are arrays, as in U.S. Pat. No. 6,847,354, and interfaced with electrode structures disposed as a grid X-Y. These technologies are poorly adapted to the instrumentation of surfaces with more complex shapes.

In particular, they are hardly applicable to devices for virtual controls or gestural interfaces based not on an instrumented planar surface but on other types of geometries including cavities, reliefs, undulations simulating for example keys, buttons or wrapping the user wherein sensors can be disposed as various geometries, sometimes under dielectric materials with a high thickness, and must sometimes be able to be disposed and managed independently of one another.

Document FR2884349 to Roziere is known, which discloses a system based on capacitive sensors including a single measurement electrode. The device enables objects to be detected beyond 10 cm with each electrode, thanks to a floating bridge electronics. The measurements from the electrodes are sequentially read by means of a scrutinizing system.

However, this device, intended to equip walls of movable instruments, is specifically designed to cover anti-collision applications, and does not cover the gestural interface applications.

Whereas gestural interfaces will have an increasing importance, the touch however remains prevailing, even in virtual interfaces capable of detecting movements at a distance, for psychological and security reasons in particular. Indeed, on the one hand the tactile feeling promotes comfort to the user, on the other hand the touch allows efficient validation of commands in operating contexts where security is important (medical equipment, vehicles).

The object of the present invention is to provide a gestural interface and a gestural and tactile interface, comprised of a device and a method for monitoring actions and inputting controls, which is compact and integrable in a variety of environments, while allowing:
anticipating actions by accurate measurements of displacements without contact, and
securely validating commands through detection of physical actions on a surface.

SUMMARY

This object is achieved with a device for control interface sensitive to a movement of a body or of an object, comprising:
a detection surface,
at least one capacitive sensor, said sensor(s) each comprising a measurement electrode including an active surface facing the detection surface, or substantially coinciding with said detection surface,
a guard of electrically conducting material disposed in proximity to the measurement electrodes at least along their face substantially opposite to the active surface, which guard is excited at an alternating (AC) electrical potential substantially identical to that of the measurement electrodes,
electronic means for exciting the measurement electrodes and processing the signals emanating from said capacitive sensors, so as to provide distance information between the active surface of the electrodes and said object.

According to the invention,
the active surfaces of the measurement electrodes are independent of one another, and
the electronic means of excitation and processing are further arranged to interrogate said measurement electrodes independently of one another.

Advantageously, the electronic means of excitation and processing can have a measurement extent enabling both:
detecting and identifying a relative movement of the body or of the object with respect to the active surface of the measurement electrodes, and
detecting a contact of said body or of said object with the detection surface.

The detection space is defined as the space portion wherein the capacitive sensors are able to detect an object and to measure the distance thereof.

Detectable objects with a device according to the invention are capacitively detectable objects, that is substantially electrically conducting and able to make up an electrical ground. These objects are not necessarily connected to the ground through an electrical connection, but they can naturally be through capacitive coupling. There can be mentioned, by way of non-limiting examples, a living being, a hand, a finger or a stylus of conducting material held in hand.

The device according to the invention enables the shape of the surface of the body or object to be measured at any time relative to the position of the capacitive sensors. The detection of the movement of an object or of a body can thus include, in a non-limiting way, its position in space, its trajectory, and the analysis of its shape, for example for identification purposes.

Advantageously, the electronic means of excitation and processing can at least in part be referenced to the electrical potential of the guard.

This floating bridge configuration of electronics enables stray capacitances to be removed. Thus, the capacitance measured by each sensor are directly those created between the object aimed at and the electrodes. The sensitivity of the device is optimized and allows a very resolved high distance measurement. Moreover, the capacitive sensors and associated electronics can then be optimized to achieve a high measurement extent, or dynamics. Indeed, the capacitance range to be measured with each electrode can extend from less than one thousandth picofarad to several picofarads, that is a dynamics in terms of capacitance that is higher than 1000. This dynamics enables, with substantially the same side resolution related to the electrode size, the presence or position of a far object such as a finger at more than 5 cm distance as well as the contact and pressure of this finger for example onto the dielectric covering the measurement electrode to be detected. In this manner, the device according to the invention enables both anticipating actions by identifying the approaching object or its approach mode, and validating controls by detecting the contact.

According to another advantageous aspect of the device according to the invention, each capacitive sensor comprises a single measurement electrode which is independent from the electrodes of the other sensors. It is thus possible to dispose the electrodes with very varied geometries and surface shapes. The electrodes being independent is a particularly advantageous aspect of the device according to the invention for making gestural interfaces based on structures having any shape, and, in that sense, it differs from gestural interfaces of prior art based on array structures of sensors disposed on planar surfaces or screens.

According to particular embodiments, the electronic means of excitation and processing can comprise scrutinizing means enabling the measurement signals emanating from the capacitive sensors to be sequentially read. The electrodes which are not currently scrutinizing can advantageously be connected to the potential of the guard.

In this embodiment, the electrodes are sequentially selected in order to limit the number of components and the energy consumption. Connecting the electrodes which are not currently scrutinizing to the potential guard enables the electrostatic edge effects of the measuring electrodes to be reduced at the most.

According to other embodiments requiring more components, each electrode can be connected to an electronic circuit so as for example a charge amplifier. These electronic circuits are referenced to the floating electric potential, thus to that of the guard, which enables the advantageous property that each electrode is seen as a guard for its neighbors is preserved. This solution enables the measurement rate to be increased because the capacitances or distances can be measured in parallel on all the electrodes.

It is of course possible to implement other modes for scrutinizing electrodes, such as for example a reading by group.

According to particular embodiments, the electronic means of excitation and processing can comprise means for electrically gathering measurement electrodes, such that said gathered electrodes make up a single measurement electrode.

It is thus possible to create electrodes with a higher area, enabling the measurement extent to be increased to detect objects at a higher distance. The configuration of electrode groups can of course be electronically performed, and be controlled by calculating means. The measurement electrodes can for example be gathered when the object is far from the panel in order to favor the measurement extent, and split when the object is close to the electrodes in order to favor the spatial resolution and accuracy of the three-dimensional position of the object.

Advantageously,
  the area of electrodes can be calculated such that each sensitive sensor can measure the distance between the active surface of the electrode and a finger up to a distance of at least 3 cm, of depending on applications, 5 cm;
  the measurement electrodes can be made on a flexible printed circuit type support. Thus, they can be made according to conventional techniques for making electronic circuits, and be disposed as surfaces or surface sets which are not necessarily planar,
  the measurement electrodes can also be made on a rigid printed circuit type support,
  the electronic means of excitation and processing referenced to the potential of the guard can be attached on the same support as the electrodes.

A part of electronics being referenced to the potential of the guard, it can advantageously be placed in proximity of the electrodes without running the risk of disturbing their operation, and the integration condition of the device can thus be improved. Indeed, if these electric circuits were referenced for example to the external ground potential (potential close to that of the object or finger), the field lines of the electrodes would be very rapidly absorbed by these circuits and the range of the device would not allow a contactless detection to be made. This is a major problem in many devices of prior art.

Advantageously, the part of electronics referenced to the guard can communicate with external systems by using the reference ground of these external systems. The link and the decoupling between the capacitive electronics and the outside can for example be made by means of optocouplers or choke coils (inductances). The supply to the floating part referenced to the guard can be made with a DC-DC converter or choke coils.

According to another aspect of the invention, the device can further comprise a dielectric material disposed on the active surface side of the measurement electrodes. In this case, the surface of said dielectric material opposite to the electrodes makes up the detection surface.

Advantageously,
  the dielectric material can be disposed so as to be substantially contacting the active surface of the electrodes,
  the dielectric material can comprise a flexible material enabling the detection surface to be substantially deformed towards the measurement electrodes by local thinning of the material due to a supporting force.

Using a flexible material advantageously enables pressure exerted onto the surface to be detected by measuring the displacement of the object beyond the position of the detection surface at rest.

According to another embodiment, the dielectric material can comprise a substantially rigid plate, movable to the measurement electrodes due to a supporting force, at an angle depending on the point of application of said supporting force.

The plate can be provided with capacitive and detectable electrodes on at least one part of its surface, so as to be able to measure the displacement or deformation thereof by means of judiciously placed capacitive electrodes. This plate can for example be a keyboard subjected to the pressure of an object or finger.

With at least two capacitive electrodes disposed facing electrodes of the plate and measuring the distance from these electrodes, it is possible to measure the keyboard angle and to assess the approximate area depressed by the finger.

According to another configuration, an assembly, for example a keyboard, comprising a dielectric plate covering first measurement electrodes, can be able to be globally displaced due to the pressure towards second measurement electrodes, which measure this pressure.

Advantageously, these second electrodes can be of an optimized sensitivity for low displacements.

Advantageously,
  the dielectric material can be selected so as to have a texture which is pleasant to the touch,
  the detection surface can have relief shapes marking out controls.

The detection surface can be planar, but also of any shape allowing in particular an optimum integration in terms of aesthetics and ergonomics. It can be, for example and not limited to, of a spherical or hemispheric shape to mimic a computer mouse or a part of a control panel of a medical machine.

A device according to the invention can be integrated according to a variety of configurations, for example to a chair arm rest for the disabled, or a dashboard of a vehicle. It enables in particular control electromechanical buttons to be replaced, for example for reliability reasons.

In a non-limiting way, the detection surface can be assimilated to a control panel. Preferably, the measurement electrodes are juxtaposed the one another in order to avoid dead areas, wherein objects are not detected, on the panel. Dead areas can thereby be intentionally created wherein the electrode is replaced by a guard or a ground, which enables the field lines of neighbor electrodes to be deflected for reducing the range thereof or changing them.

In order to achieve a good trade-off between side resolution and detection range of the objects, it is advantageous to select an electrode size substantially of the same order of magnitude as that of the object. For example, to optimize the detection of a finger, it is advantageous to select an electrode area in the order of 1 $cm^2$ to 2 $cm^2$.

The electrode shape can be adapted depending on the desired detection characteristics, and several electrode shapes can exist in a same device. For example, it is possible to dispose electrodes with a particular shape, for example rectangular, onto edges of a control panel to detect on which side a finger or a hand approaches. For example the device can then be able to select actions allowed for a person, depending on the side from which he/she addresses the panel.

A device according to the invention can provide as output data, in a non-limiting way, either analogue measurement signals, or digital signals, or directly the distances separating the electrodes from the object or directly, for example, the three-dimensional position, the object movement analysis, the object identification or control commands.

For a three-dimensional detection, each electrode of the device can be considered as one pixel and the physical spatial resolution is limited by the area of the electrodes. This spatial resolution can be substantially improved by means of interpolation numerical calculation methods. One method consists in for example calculating the center of gravity of the objet "seen" by all the electrodes. This theoretical center becomes a virtual point which can be viewed on a screen. This allows for example to accurately write, draw or act on a reduced area represented on a screen with an object such as a finger or a hand.

The three-dimensional detection also enables the device to be used as a capacitive camera. Indeed, the system enables the absolute distance separating each electrode from the targeted objet to be measured in real time and, with a sufficient number of electrodes, it is possible to image or recognize this object.

The device according to the invention is also intended to detect the contact of the object (or the finger) with the detection surface (or the control panel) with a sufficient degree of certainly to ensure the desired operating security. To do this, assuming that the position of the detection surface is known for example through calibration, it is possible to determine directly a contact from the distance measurement of the object, when detecting that the object is at a distance corresponding to that of the surface.

According to an advantageous embodiment according to which the detection surface is made of a dielectric material contacting the surface of the electrodes, it is possible to detect the contact more certainly from the capacitance analysis between the object and the electrode. Indeed, when a finger for example is contacting the dielectric surface, there is substantially no air on the electric field lines path between the finger and the electrode. Besides, the dielectric material has a dielectric permittivity higher than that of the air, for example in the order of $\varepsilon_r=3$.

Consequently, the capacitance between the finger and the electrode is substantially higher when the finger is contacting the surface, compared to the case where there remains a thin air blade, which enables the contact to be more certainly detected.

It is also possible, in a device according to the invention, that the electrodes are not covered with the dielectric material. In this case, the contact between the object and an electrode can be detected since the electrode is placed in the ground electric potential of the object upon contacting.

The pressure can advantageously be measured by measuring the depression of an object such as a finger in a substantially flexible or soft dielectric material covering the electrodes. The measured distance is substantially proportional to the depression of the finger into the dielectric material. Moreover, the measured distance variation, which is also substantially inversely proportional to the capacity, is multiplied by the dielectric relative permittivity $\varepsilon_r=3$ which covers the electrode, which results in an increased distance measurement sensitivity once there is a contact between the finger or object and the dielectric.

Another solution for measuring the pressure can consist in measuring the increase in capacitance due to the increase in the supporting area of an object such as a finger contacting the surface of a relatively rigid dielectric material, when the exerted pressure increases.

The present invention therefore allows detecting, without contact and at several centimeters or even decimeters, the position of a finger or object in space, detecting the contact of the finger or of an object on a detection surface such as a control panel or a keyboard for example, and also detecting the pressure exerted by the finger or object onto this surface. The measurement can be performed through any dielectric material. These characteristics enable very advanced, aesthetical and ergonomic control interfaces to be created with original control combination possibilities.

It is for example possible, in a non-limiting way, to recognize signs through the movement of fingers, to determine the side of the active surface from which a hand comes from for the purpose of controlling actions allowed or not by different people lying in front of the interface and to validate a major control by a light touch or pressure of the finger onto the keyboard.

The use of the device according to the invention is of course not limited to the detection of a single finger, and the controls emanating from movements of several fingers being simultaneously or not can be contemplated.

A device according to the invention enables the position of a finger to be detected through any type of dielectric, even several millimeters or even centimeters thick. This advantage enables control devices to be designed with plenty of shapes, reliefs, colors and touch feeling enabling them to be more pleasant to use. Quality materials such as wood, leather, ceramics or any type of rigid or flexible polymer such as silicone can for example be implemented. In particular, a soft material such as silicone can impart a more pleasant touch feeling.

Advantageously, the dielectric can be easily replaced in particular for hygiene or aesthetical reasons. This dielectric can be a washable or sterilizable material, which makes the device according to the invention particularly suitable for making interfaces in environments where hygiene is an issue.

The invention can also relate, in a non-limiting way, to:
- a control equipment providing a man-machine interface function integrating a capacitive device for movement detection according to the invention,
- a control equipment for being integrated to a vehicle, comprising a capacitive device for movement detection according to the invention,
- a sensitive wall structure integrating a control device according to the invention.

According to another aspect, it is provided a method for control interface sensitive to a movement of a body or of an object, implementing a device according to the invention, comprising:
- exciting one or more measurement electrodes within at least one capacitive sensor, said measurement electrodes (i) including an active surface facing a detection surface, or substantially coinciding with said detection surface, and (ii) being provided with a guard of electrically conducting material disposed in proximity to the measurement electrodes at least along their face substantially opposite to the active surface,
- exciting said guard to an alternating (AC) electrical potential substantially identical to that of the measurement electrodes,
- processing signals emanating from said capacitive sensors, so as to provide distance information between the active surface of the electrodes and said object,
characterized in that the measurement electrodes have independent active surfaces and are interrogated independently of one another.

In a particular embodiment, the method according to the invention which comprises measuring at least one distance between the object and the detection surface, and processing said distance measurements to provide approach information, is characterized in that it further includes:
- measuring the contact between the object and the detection surface, and
- processing said contact measurements to provide touch information.

The contact can of course be a light touch of the surface.
According to advantageous aspects,
- the detection of the contact between the object and the detection surface can comprise comparing measured capacitances with at least one threshold value,
- processing the distance measurements can comprise detecting the position of the object in space obtained at least from distance measurements and knowledge about the disposition of the capacitive sensors, and
- processing the contact measurements can include identifying capacitive sensors which have detected a contact between the object and the detection surface.

The method according to the invention can further comprise:
- measuring the displacement of the detection surface due to the object,
- processing said displacement measurements to provide support information.

Advantageously,
- the method according to the invention can further comprise a step of determining controls, which controls are conditioned at least by at least any of the approach, touch and supporting information,
- at least one control determined by any of touch and support information can be conditioned by the approach information,
- at least one control can be conditioned by the time change of at least any of the approach, touch and support information.

Thus, the method according to the invention enables controls to be generated by taking into account up to three information levels:
- approach information,
- touch information,
- support information.

Of course, the three information levels can appear and be processed simultaneously, and this information can include the time change of measurements or their history.

In a non-limiting way,
- the approach information can for example comprise distance, trajectory, identification of one or more objects from their shape. They can be used for example to adapt the interface to the current mode of action: activation, selective lighting, adaptation of the interface to a use by a left-handed or a right-handed, by a hand or a stylus, . . .
- the touch information can comprise for example the contact place, simple or simultaneous trajectories on the surface, simple or repeated tappings. They can for example be used for validating controls (buttons), inputting data (writing), scrolling or zooming a display, . . .
- the support information can include for example a pressure in a place, along one or more trajectories, simple or repeated pressed tappings, as well as pressure duration. They can for example be used to perform proportional controls (adjusting a rate, intensity), block controls, . . .

Certainly distinguishing the approach and touch (or light touch) is crucial for interfaces intended to applications requiring some security level. This enables a crucial security requirement to be met, which sets out that a command must be selected and be validated in order to prevent inopportune actions.

Advantageously, with the method and the device according to the invention, the selection can be made contactless which allows a significant flexibility gain. The detection and analysis of the approach can also be used to provide the device with a control anticipation or preparation capacity which can also be a security factor.

These security requirements are found in particular for interfaces intended to medical equipment or vehicles, in particular automotive ones, for which the device and method according to the invention are particularly suitable.

Of course, the device and the method according to the invention are not limited to applications related to security. Generally, the following application possibilities can be mentioned by way of non-limiting examples:
- the extended three-dimensional control applications in general, for gestural controlling, for example known as "3D touch panel", "3D gesture controllers", "3D floating vision";
- home automation, with for example controls for light, air-conditioning, shutters, door opening . . .
- household electrical appliances, for any kind of controlling and programming for apparatuses such as washing machines . . .
- user interfaces of portable equipment, telephones, GPS, . . .

user interfaces of office IT and data processing equipment, computers, . . . electronic game interfaces with gestural control;

interfaces for driving and controlling functions of vehicles in general, including in military field and aviation.

According to yet another aspect, a device according to the invention can be associated with other contactless detection and/or identification means to make global gestural interfaces comprising several detection levels of a user. It is for example possible:

to locate a user, for example in a vehicle passenger compartment, by means of capacitive sensors at a higher measurement distance, or optical or ultrasound sensors, so as to preconfigure a gestural interface according to the invention. For example, some functions can be differently configured depending on the position and the number of occupants;

to identify, for example with a camera and image recognition means, movements and/or characteristics of a user (gender, clothing, identity, morphology or any other characteristics . . . ) so as to adapt the gestural interface to his needs or, for access control applications, to his authorization level.

Thus, it is provided a multiscale gestural interface integrating a control device according to the invention, characterized in that it further comprises optical imaging means such as for example a 3D camera.

Advantageously, these optical imaging means can comprise an optical camera.

It is also provided a method according to the invention implementing a multiscale gestural interface, characterized in that it further comprises:

a step of detecting the objet through optical imaging, providing image information, and a step of processing this image information to determine one or several controls.

According to another aspect, the device according to the invention can advantageously be associated with a vocal interface. Thus, it is provided a gestural and vocal interface integrating a control device according to the invention, characterized in that it comprises means for recognizing controls performed through voice.

It is also provided a method according to the invention implementing a vocal interface, characterized in that it further comprises:

a step of vocal recognition, and a step of processing this vocal information to determine one or more controls.

According to yet another aspect, a device according to the invention can advantageously be associated with a multiscale gestural interface including optical imaging means and vocal recognition means for making a global virtual interface thereby comprising several technologies. It is thus possible for example to perform multiscale and vocal gestural controls.

Thus, it is provided a capacitive, optical and vocal multiscale gestural interface integrating a control device according to the invention, characterized in that it comprises optical gestural recognition means and voice performed control means.

It is also provided a method according to the invention implementing a vocal interface, characterized in that it further comprises:

a step of detecting the object through optical imaging, providing image information, and a step of processing this image information to determine one or more controls, a step of vocal recognition, and a step of processing this vocal information to determine one or more controls.

BRIEF DESCRIPTION OF THE DRAWINGS

Further advantages and features of the invention will appear upon reading the detailed description of non-limiting implementations and embodiments, and the following appended drawings wherein.

DETAILED DESCRIPTION

Figure 1:
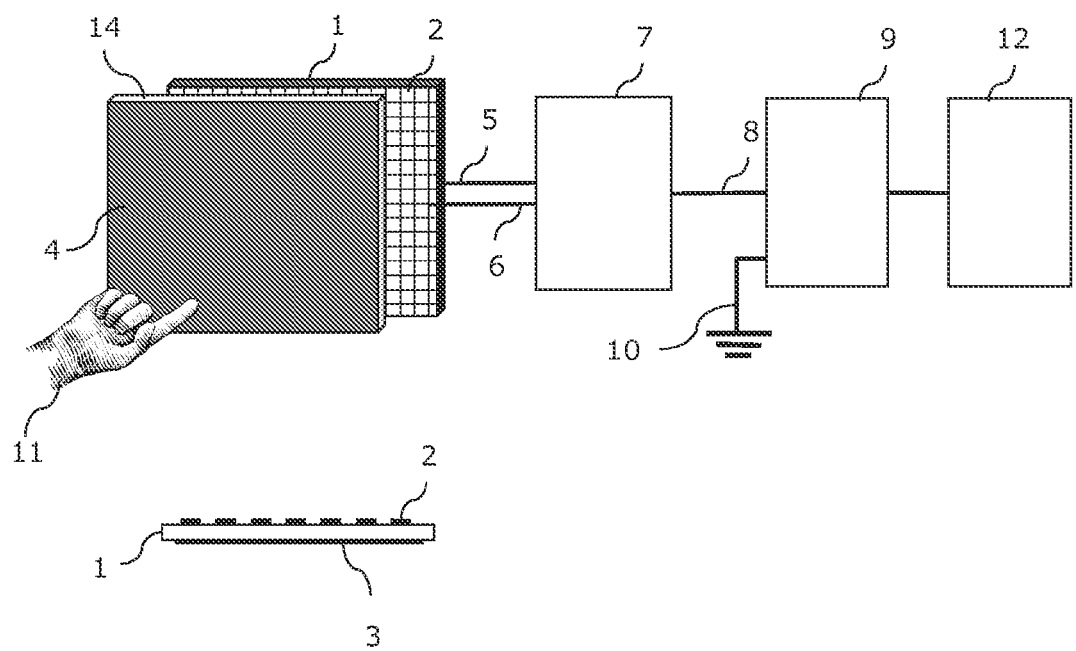
FIG. 1 illustrates a general diagram of the device according to the invention.

In reference to FIG. 1, the device according to the invention comprises an assembly of capacitive sensors made on a double-sided flexible printed circuit 1. The measurement electrodes 2 are etched each on one of the faces of the printed circuit 1, whereas the second face of the circuit supports the guard 3.

Each electrode 2 is connected by a connecting track 6 to the excitation and measurement electronics 7. The connecting tracks 6 are etched on the same face of the printed circuit 1 as the electrodes. The guard 3 is also connected to the electronics 7, which is floating and referenced to the potential of this guard, through an electrical connection 5. Depending on the configuration of the device, the electrical connections 5 and 6 can comprise coaxial cables.

A plate of dielectric material 14, for example in silicone, is placed in front of the electrodes 2, so as to be in contact with their active surface.

Figure 2:
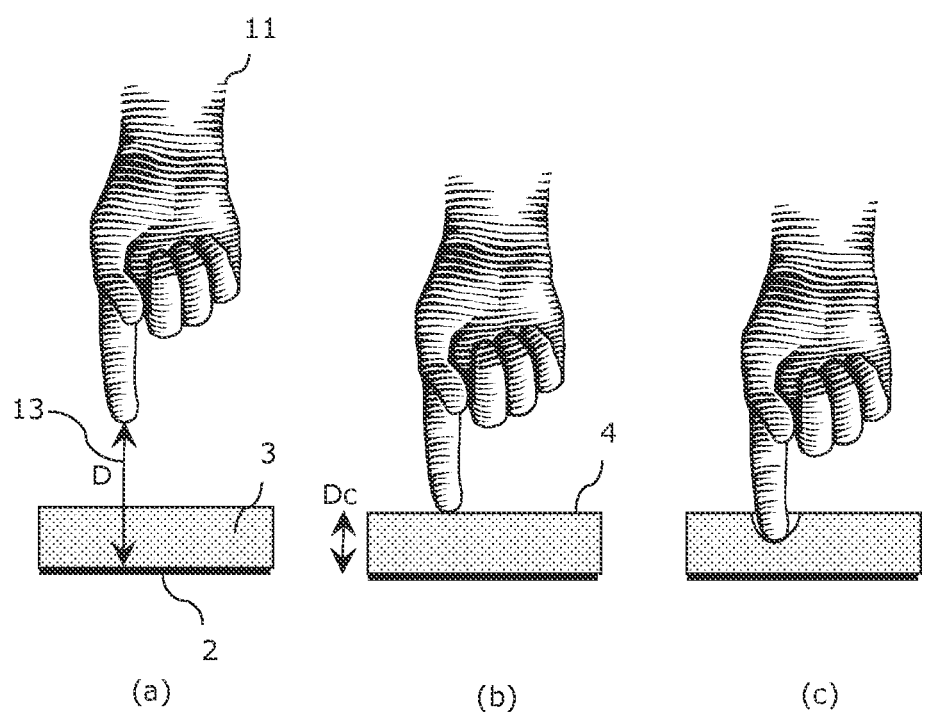
FIG. 2 illustrates interaction modes with the device according to the invention.

In reference to FIG. 2, when an object 11 such as a hand or a finger approaches the device, there is created an electrical coupling with the capacitive electrodes 2. The electrodes 2 and their associated electronics 7, 9 measure the capacitance C established between them and this object 11, so as to deduce therefrom the distance 13 by the relationship:

$$C = \varepsilon_0 \cdot \varepsilon_r \cdot S/D,$$

where so is the permittivity of free space, $\varepsilon_r$ is the dielectric material 14 or air relative permittivity, which are to be taken into account on the distance where they are present, S is the area of the electrode, in the order for example of 1 to 2 cm$^2$ to detect a finger in good conditions, and D is the distance to be measured.

The measurement of the distance D or capacitance C makes it possible to determine:

the distance from the object 11 when it approaches (FIG. 2a), the physical contact between the object 11 and the detection surface 4, which corresponds to the case where the distance D is substantially equal to the thickness Dc of the dielectric material, with known characteristics (FIG. 2b), and, if any, the depression of the object 11 into the dielectric material 14, which corresponds to the case where the distance D is substantially lower than the thickness Dc (FIG. 2c), and which can be translated into terms of pressure or force.

Figure 3:
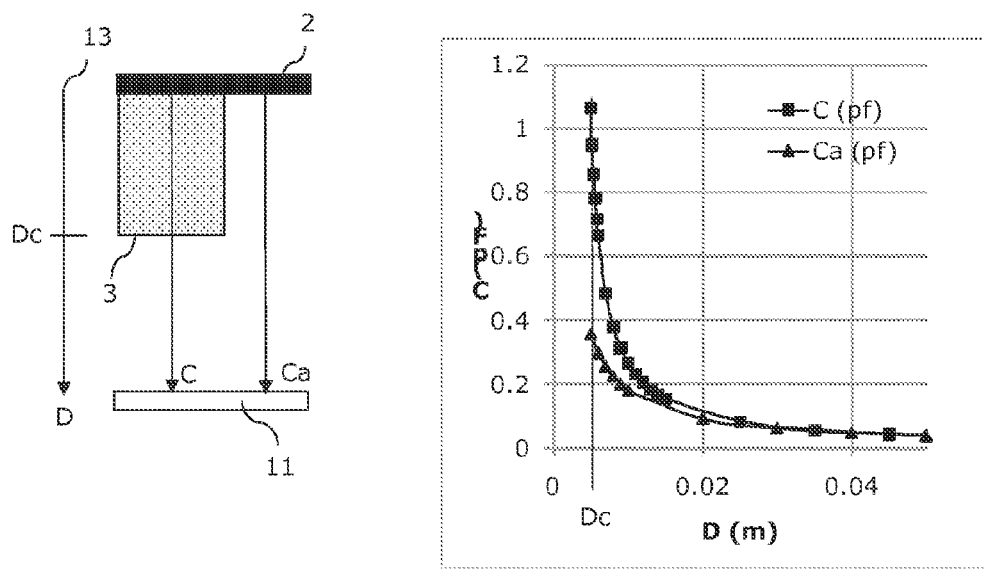
FIG. 3 illustrates a mode for detecting the contact between an object and the device according to the invention.

The detection of the physical contact is of particular interest for example for a control actuation security. This detection is substantially improved by the presence of the dielectric material. FIG. 3 presents a graph comparing the change in the capacitance measured by an electrode 2 with an area of 2 cm², as a function of the distance D up to an object 11, in the presence of a dielectric material 14 with a relative permittivity $\varepsilon_r=3$ and a thickness Dc=5 mm (curve C) and in the absence of this material, respectively (curve Ca). It is seen that in the presence of the material 14 (curve C), the measured capacitance strongly increases when the object 11 is in close vicinity of the surface of the material.

The contact can thereby be detected with a higher sensitivity when the material 14 has a high relative permittivity. This detection can be advantageously performed by comparing the capacitance measured with one or more threshold values.

In the same way, when the object depresses into a flexible dielectric material 14 (FIG. 2c), its position can be measured with a higher sensitivity when the relative permittivity of the material is high. This advantageously enables accurate pressure measurements to be performed by measuring relatively low displacements.

A crucial characteristic of the device according to the invention is to allow high accuracy measurements, both at several centimeters or even decimeters and in close vicinity to the electrodes. This result is achieved thanks to the implementation of the electronic method which enables both a great sensitivity and a very good immunity to electromagnetic disturbances of environment to be reached. The issue of immunity to disturbances besides is extremely important in an environment of digital control devices.

The electronics implemented in the present invention is based on the floating bridge measurement method described in document FR2756048.

Figure 7:
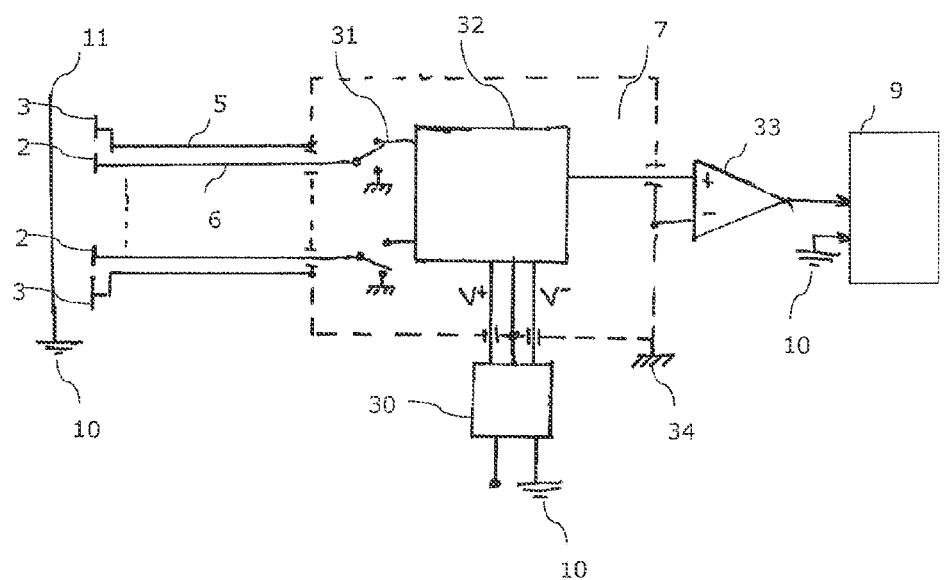
FIG. 7 illustrates a first embodiment of the electronic means of excitation and processing.

FIG. 7 presents a first exemplary embodiment of the electronics. The capacitance of the electrode 2 is measured by a capacitance meter 7 referenced to the potential 34 of the guard 3, in a fully floating manner with respect to the general ground 10. The guard 3 and the electrodes 2 are excited at an alternating (AC) voltage at a fixed frequency by means of the circuit 7, so as to allow a synchronous demodulation of measurements. The floating electronics 7 is powered for example by a DC/DC direct current voltage converter 30. The measurement signal after demodulation is transferred to the circuit 9 referenced to the general ground by a differential amplifier 33 to be able to be transmitted to the calculating means. A multiplexer 31 enables the electrodes 2 to be sequentially interrogated, whereas the inactive electrodes are held at the potential guard 34.

Figure 8:
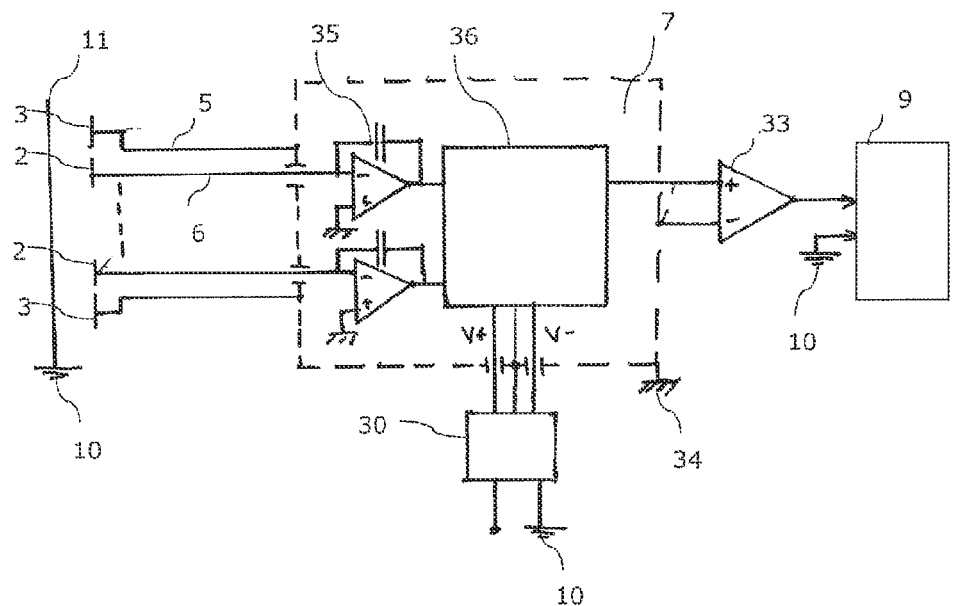
FIG. 8 illustrates a second embodiment of the electronic means of excitation and processing.

FIG. 8 presents a second exemplary embodiment of the electronics. It differs from that of FIG. 7 in that all the electrodes 2 have their own detection electronics 35 and can be simultaneously read.

According to particular embodiments, the DC/DC converter 30 can be replaced by a cheaper power supply referenced to the general ground 10, and coupled to the floating circuit 7 by choke coils, the output differential amplifier 31 can be replaced by optocouplers or choke coils.

The electronics implemented enables capacitances in the order of 0.001 pF (picofarads) up to a few picofarads to be measured, with an accuracy in the order of 0.001 pF.

Taking the example of the position measurement of a finger placed at 50 mm from an electrode with an area of about 2 cm², one can assess that the measured capacitance is about 0.035 pF. Under these conditions and at this distance, the electronics sensitivity is 0.7 pF/m and the accuracy of the position measurement is lower than $10^{-3}/0.7=1.4$ mm.

When the finger is moved farther away, the sensitivity quickly decreases because the field lines begin to widen on the hills. Indeed, the guard surrounding the selected electrode represents at the most the entire detection surface 4. For a panel with a conventional dimension (100 to 200 mm side), the field lines of an electrode of 2 cm² widen beyond a distance of about 50 mm. With a panel having a higher area, a finger can even theoretically be detected at more than 100 mm but the side resolution will dramatically be degraded.

A hand can be very easily detected at more than 300 mm if electrodes are gathered to achieve for example an electrode area of 2500 mm². At this distance, the measured capacitance is about 0.073 pF.

These performances can be achieved using the floating bridge technique because the electronics only measures the capacitance between the electrode 2 and the object 11. In devices of prior art such as in U.S. Pat. No. 6,847,354, stray capacitances generated by the circuit for measuring and creating the guard remains higher than 1 pF and the stability of this stray shift, given rise to noise, is in the order of a few tens to a few hundreds of femtofarads.

The floating bridge technique implemented using an excitation of an alternating signal with amplitude modulation and demodulation also makes it possible to ensure a very good rejection in the impedance variation of the dielectric materials 14 surrounding and covering the electrodes 2.

Moreover, the floating bridge has the feature to directly measure the inverse of capacitance between the electrode 2 and the object 11, which enables a signal linearly proportional to the distance to be measured 13 to be obtained. This advantage is essential because, at a great distance, the capacitance hardly varies with distance (according to a hyperbolic law), and the natural shifts of electronics and signal digital means drift more than the capacitance to be measured.

Figure 4:
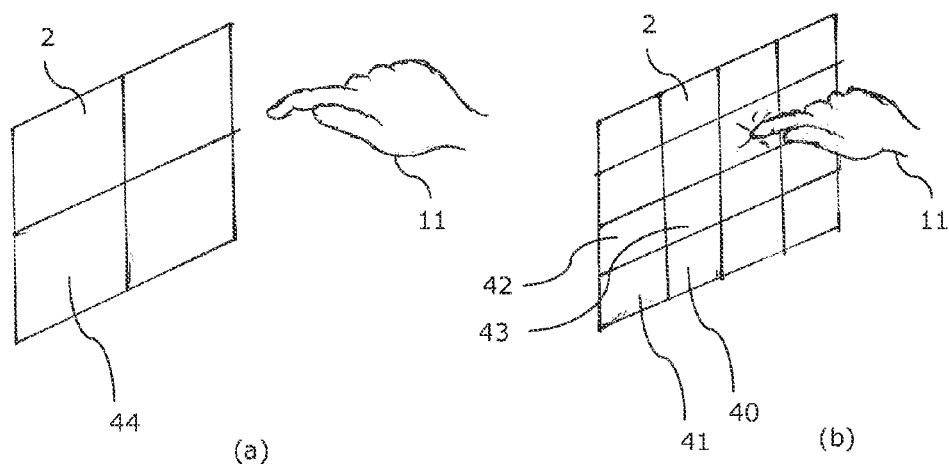
FIG. 4 illustrates an exemplary gathering of measurement electrodes to increase the range of the device.

In reference to FIG. 4, the capacitive electrodes can be electronically gathered, for example by means of the multiplexer 31, so as to make up electrodes with higher areas capable of detecting objects at a high distance. In the example of FIG. 4, the electrode 44 is made up by gathering electrodes 40, 41, 42, 43. For example, when the device does not detect objects in the vicinity thereof, it is placed in a detection mode at a great distance (FIG. 4a). When an object approaches the measured extent of individual electrodes, the device switches in the most laterally resolved mode (FIG. 4b) to detect object details. Of course, the reconfiguration can be more complex, and locally depends on what is detected by different areas.

According to particular embodiments, a device according to the invention can comprise electrode arrangements which are very different from a square matrix placed on a uniform surface.

Figure 5:
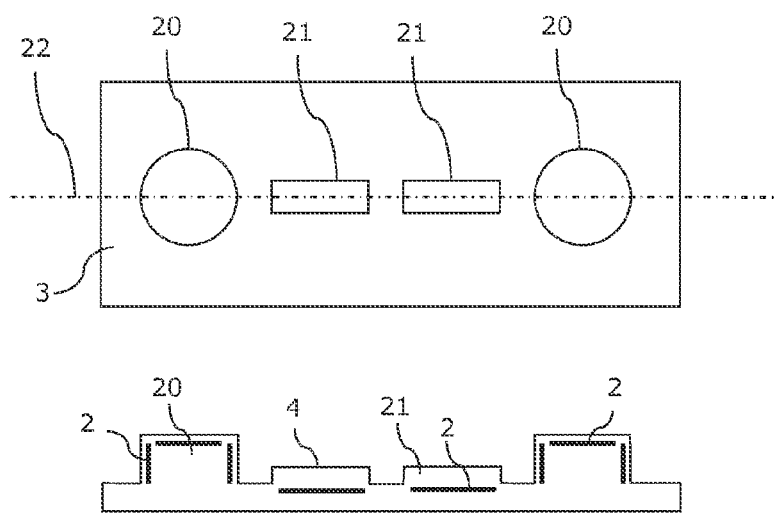
FIG. 5 illustrates an exemplary embodiment of the device according to the invention.

For example, in FIG. 5, the electrodes are placed under a dielectric material 14 the detection surface 4 of which mimics the shape of electromechanical switches such as turning knobs 20 and push buttons 21. The "pseudo-buttons" are provided with electrodes 2 enabling the approach and then the action of a user to be detected.

Figure 6:
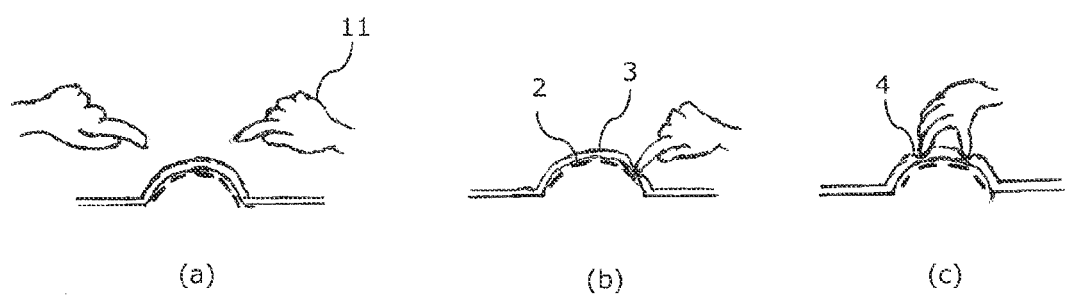
FIG. 6 illustrates another exemplary embodiment of the device according to the invention, as well as exemplary interaction modes.

FIG. 6 illustrates an interface made of capacitive electrodes disposed under a detection surface of flexible dielectric material, with a hemispherical shape. Such an interface can for example readily detect from which side a hand approaches, whether it is a right or left hand, or several hands (FIG. 6a), to interpret a control performed with a finger (FIG. 6b) or several fingers (FIG. 6c).

According to particular embodiments, the capacitive electrodes and the guard can be made by means of transparent conducting materials such as ITO (indium tin doped oxide), such that the device is substantially transparent and can be placed for example on a viewing screen.

Of course, the invention is not limited to the examples just described and numerous improvements can be made to these examples without departing from the scope of the invention.

The invention claimed is:

1. A device for sensing proximity or contact of an object, comprising:
   a detection surface;
   a plurality of capacitive sensors disposed in proximity to the detection surface;
   a guard of electrically conducting material disposed in proximity to the plurality of capacitive sensors; and
   excitation and measurement electronics electrically coupled to the plurality of capacitive sensors and the guard, and at least partially referenced to a guard potential different from a ground potential;
   wherein the excitation and measurement electronics are configured for
      providing a first potential to an interrogated capacitive sensor, the first potential referenced to the guard potential and different from the ground potential,
      providing a second potential to the guard, the second potential indirectly coupled to the first potential,
      providing a third potential to the plurality of capacitive sensors other than the interrogated capacitive sensor, the third potential indirectly coupled to the first potential, and
      processing signals emanating from the interrogated capacitive sensor to provide distance information between the detection surface and the object.

2. The device of claim 1, wherein the third potential is substantially identical to the second potential.

3. The device of claim 1, wherein the third potential is substantially identical to the guard potential.

4. The device of claim 1, further comprising:
   a flexible dielectric disposed between the detection surface and the plurality of capacitive sensors;
   wherein the excitation and measurement electronics are further configured for detecting a proximity of the object above the detection surface or a force of the object against the detection surface.

5. The device of claim 1, wherein the excitation and measurement electronics are further configured for:
   detecting and identifying relative movement of the object with respect to the detection surface; and
   detecting a contact of the object with the detection surface.

6. The device of claim 1, wherein the excitation and measurement electronics are further configured for detecting and identifying a shape of the object.

7. The device of claim 1, wherein:
   the plurality of capacitive sensors are independent of one another; and
   the excitation and measurement electronics are further configured to interrogate the plurality of capacitive sensors independently of one another.

8. The device of claim 7, wherein the plurality of capacitive sensors are configured to be formed on non-planar surfaces.

9. The device of claim 1, the excitation and measurement electronics are further configured for electrically gathering signals from a plurality of interrogated capacitive sensors to effectively form a single capacitive sensor.

10. The device of claim 1, wherein the excitation and measurement electronics comprise a multiplexer configured for enabling the signals emanating from the plurality of capacitive sensors to be sequentially read.

11. A method for sensing proximity of contact of an object, comprising:
   providing a first potential to an interrogated capacitive sensor within a plurality of capacitive sensors, the first potential referenced to a guard potential and different from a ground potential,
   providing a second potential to a guard disposed in proximity to the plurality of capacitive sensors, the second potential indirectly coupled to the first potential,
   providing a third potential to the plurality of capacitive sensors other than the interrogated capacitive sensor, the third potential indirectly coupled to the first potential, and
   processing signals emanating from the interrogated capacitive sensor to provide distance information between a detection surface and the object, the processing of the signals performed with reference to the guard potential.

12. The method of claim 11, wherein the third potential is substantially identical to the second potential.

13. The method of claim 11, wherein the third potential is substantially identical to the guard potential.

14. The method of claim 11, further comprising:
   disposing a flexible dielectric between the detection surface and the plurality of capacitive sensors; and
   utilizing the processed signals to detect a proximity of the object above the detection surface or a force of the object against the detection surface.

15. The method of claim 11, further comprising:
   detecting and identifying relative movement of the object with respect to the detection surface; and
   detecting a contact of the object with the detection surface.

16. The method of claim 11, further comprising detecting and identifying a shape of the object.

17. The method of claim 11, further comprising interrogating the plurality of capacitive sensors independently of one another.

18. The method of claim 17, further comprising forming the plurality of capacitive sensors on non-planar surfaces.

19. The method of claim 11, further comprising electrically gathering signals from a plurality of interrogated capacitive sensors to effectively form a single capacitive sensor.

20. The method of claim 11, further comprising multiplexing the plurality of capacitive sensors to enable the signals emanating from the plurality of capacitive sensors to be sequentially read.

* * * * *